Figure 4:
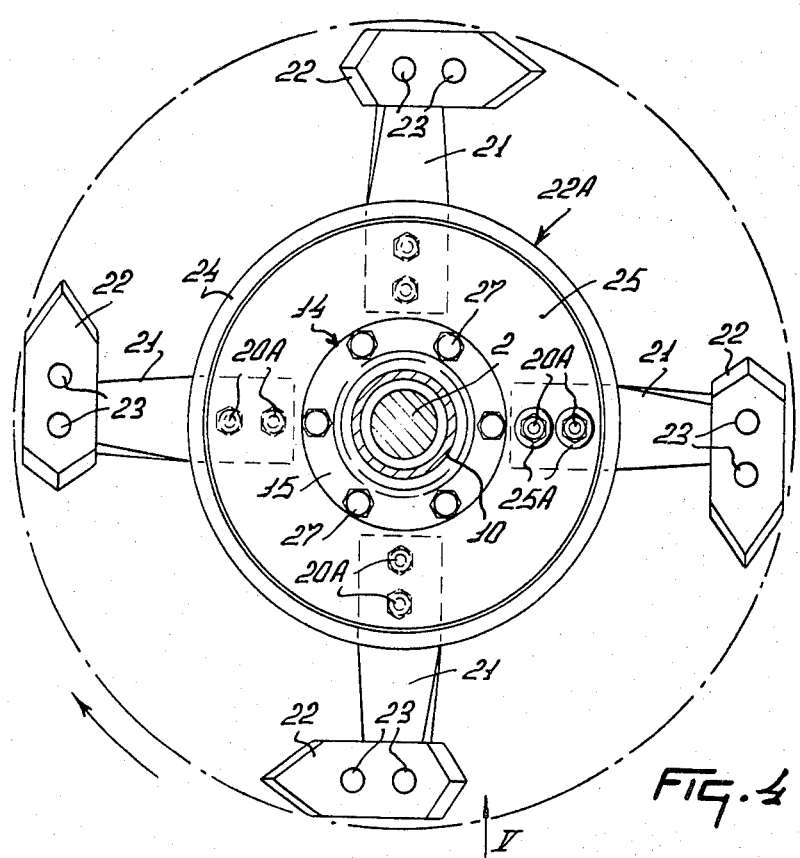

United States Patent [19]

van der Lely

[11] 4,224,997
[45] Sep. 30, 1980

[54] SOIL CULTIVATING IMPLEMENTS

[76] Inventor: Cornelis van der Lely, 7, Brüschenrain, Zug, Switzerland

[21] Appl. No.: 845,975

[22] Filed: Oct. 27, 1977

[30] Foreign Application Priority Data

Oct. 29, 1976 [NL] Netherlands .................. 7611989
Oct. 29, 1976 [NL] Netherlands .................. 7611990

[51] Int. Cl.³ .............................................. A01B 33/06
[52] U.S. Cl. ................................. 172/59; 172/52; 172/96
[58] Field of Search .............. 172/59, 111, 522, 526, 172/52, 96, 722, 706, 708

[56] References Cited

U.S. PATENT DOCUMENTS

| 488,706 | 12/1892 | Roach | 172/706 |
|---|---|---|---|
| 1,592,825 | 7/1926 | Gardner | 172/59 |
| 1,620,510 | 3/1927 | Beise | 172/523 |
| 2,088,141 | 7/1937 | Royston | 172/59 X |
| 2,521,417 | 9/1950 | Sefcovic | 172/59 |
| 2,653,532 | 9/1953 | Graham | 172/708 |
| 3,111,917 | 11/1963 | Dawrs | 172/59 X |
| 3,115,190 | 12/1963 | Listiak | 172/59 X |
| 3,148,917 | 9/1964 | Thompson | 172/111 |
| 3,667,551 | 6/1972 | Lely | 172/59 |
| 4,034,814 | 7/1977 | Lely | 172/59 |
| 4,060,134 | 11/1977 | Lely | 172/59 |

FOREIGN PATENT DOCUMENTS

| 260460 | 6/1963 | Australia | 172/59 |
|---|---|---|---|
| 443395 | 2/1936 | United Kingdom | 172/59 |
| 619713 | 3/1949 | United Kingdom | 172/59 |

Primary Examiner—Richard J. Johnson
Attorney, Agent, or Firm—Mason, Mason and Albright

[57] ABSTRACT

A soil cultivating implement has an elongated frame portion and a plurality of rotatable members mounted at the lower ends of respective elongated shafts. Each member includes a carrier and tools on radial arms are connected to the carrier. The carrier is fastened to a nonrotatable tube through a hood and flange arrangement that prevents stalks and the like from fouling the shaft housed within the tube. The tools can be rigid tines or resilient strip-like blades which are angled downwardly in the direction of rotation. Guides in the form of rods can be mounted to coextend with the tools, upwardly to the rear so that soil loosened by the tools is displaced upwardly by forces that crumble the displaced soil before the latter falls rearwardly. Drive to shafts is effected through a gear box on the frame portion and further shafts that have pinions in mesh with those on the soil working member shafts. A further implement can be linked to the frame portion and driven via a rear shaft of the gear box.

12 Claims, 13 Drawing Figures

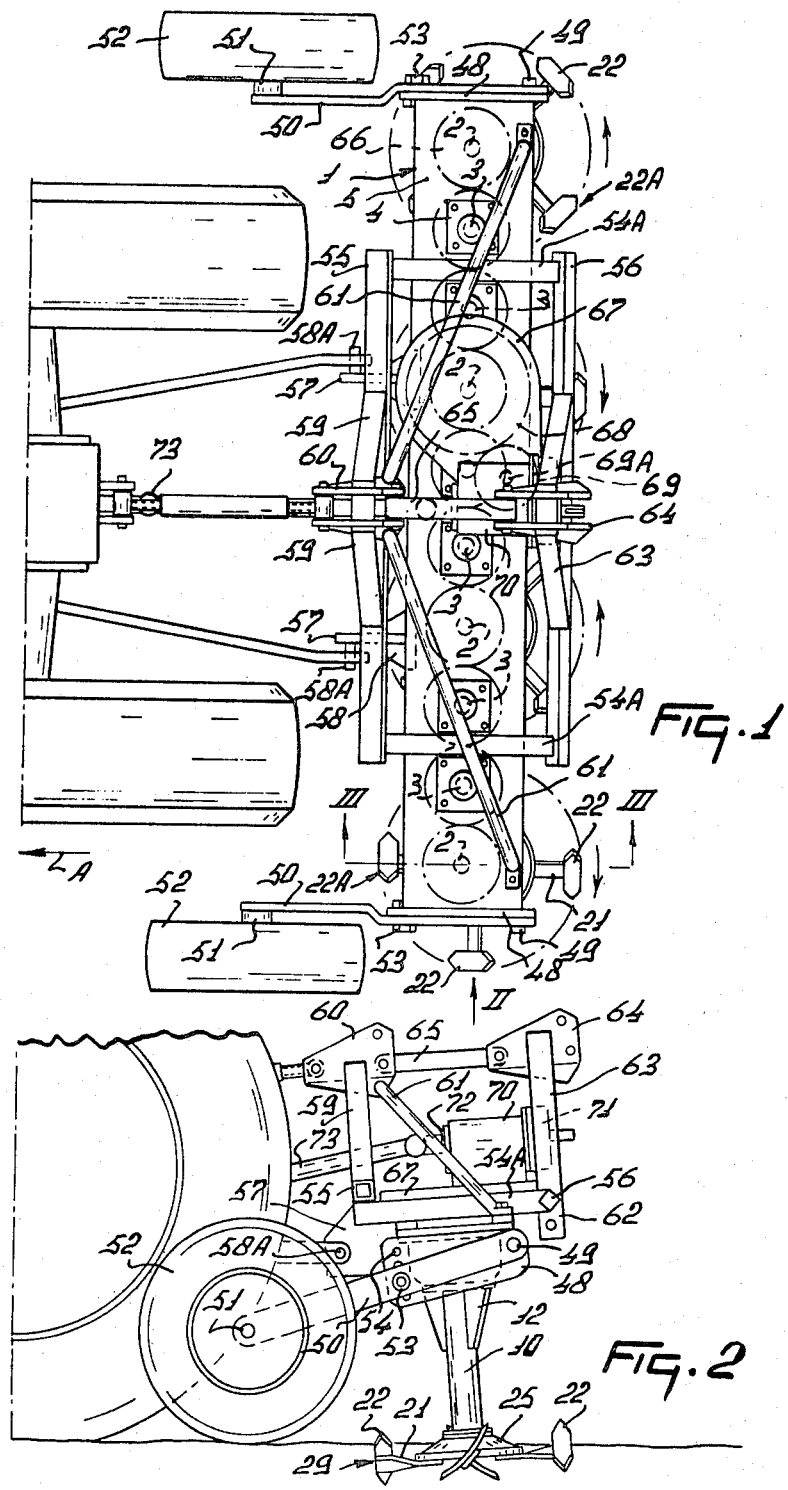

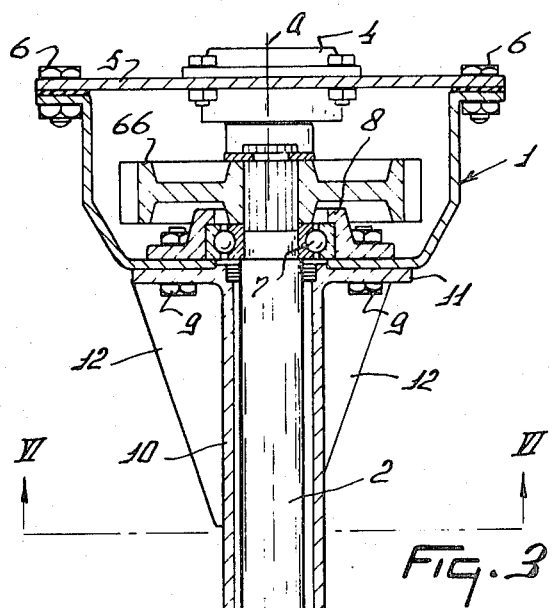
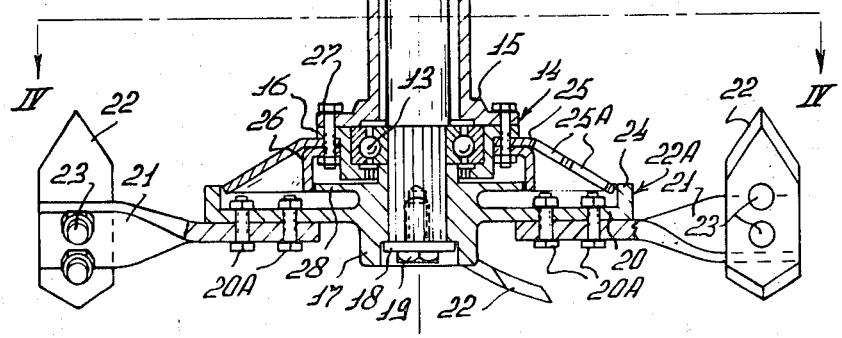
Fig. 3
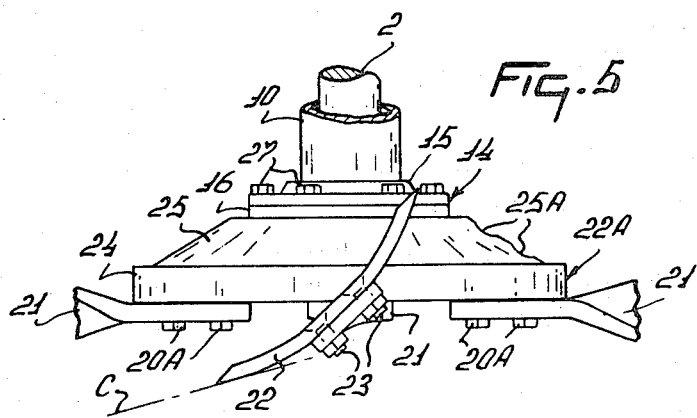
Fig. 5

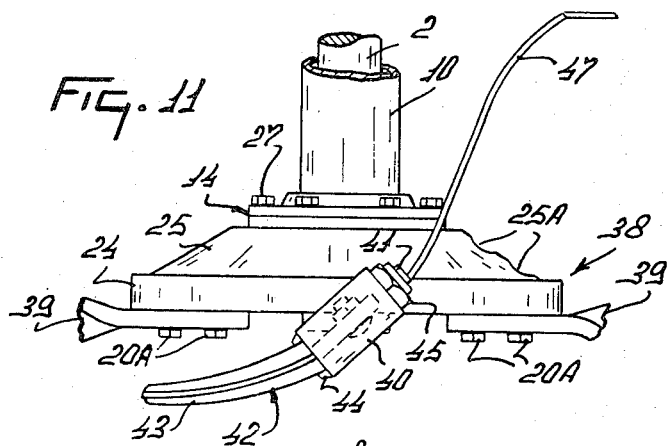
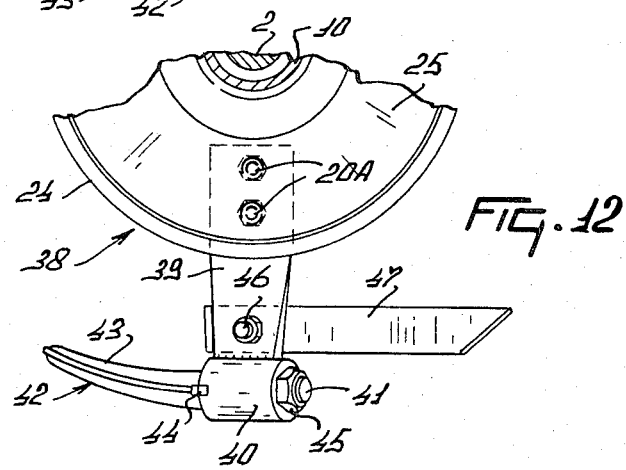
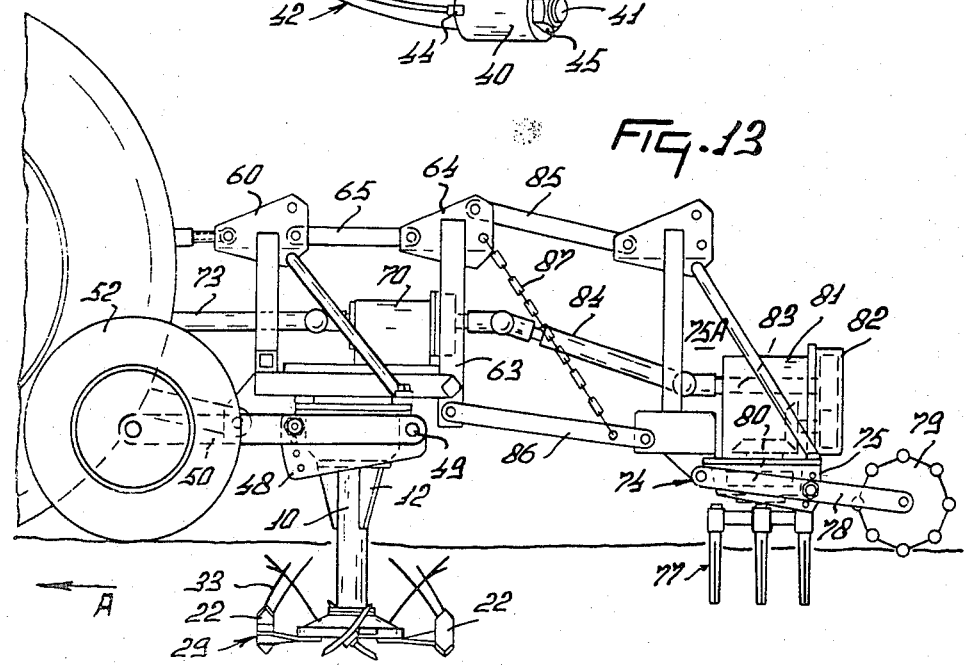

SOIL CULTIVATING IMPLEMENTS

This invention relates to soil cultivating implements or machines, which will hereinafter be referred to principally as implements alone for the sake of brevity, such implements being of the kind which comprise a plurality of soil working members that are rotatable about corresponding upwardly extending axes, each member having at least one tool connected to a carrier.

According to one aspect of the invention, there is provided a soil cultivating implement of the kind set forth, wherein said carriers are substantially disc-shaped and each tool has free ends that are located respectively at a higher level and at a lower level than that of the corresponding carrier.

Figure 6:
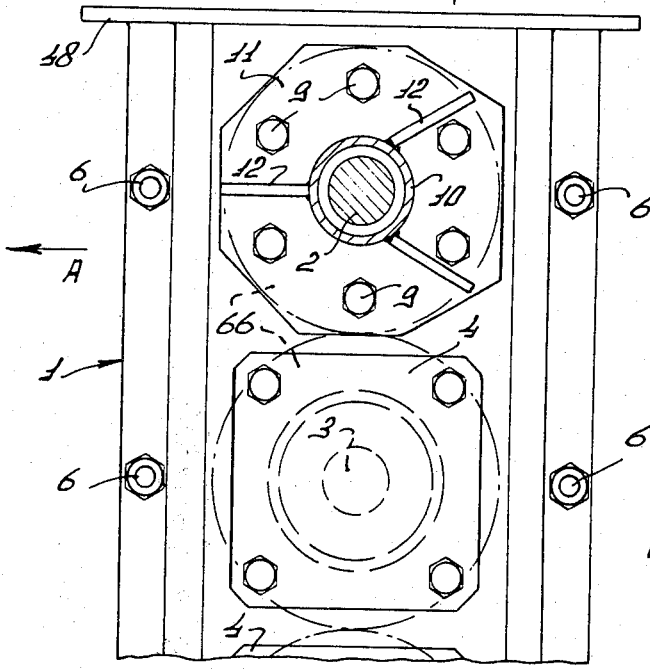
Figure 7:
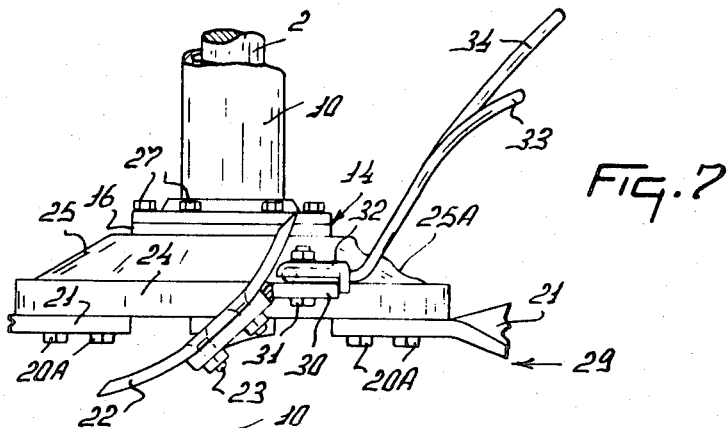
Figure 8:
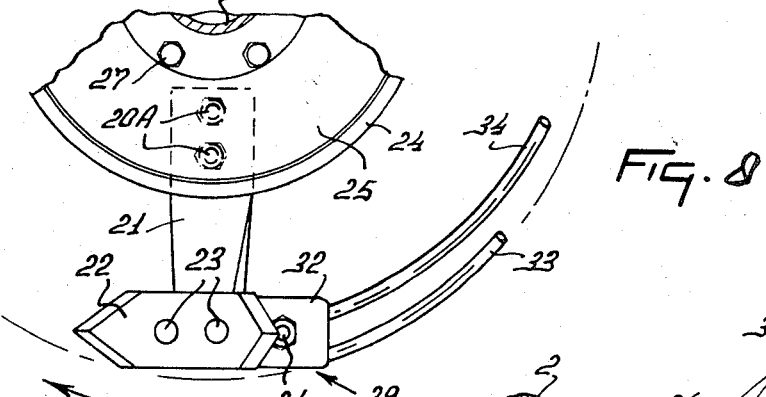
Figure 9:
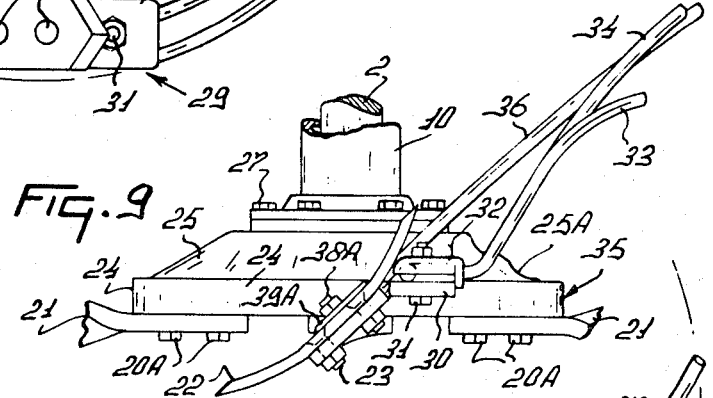
Figure 10:
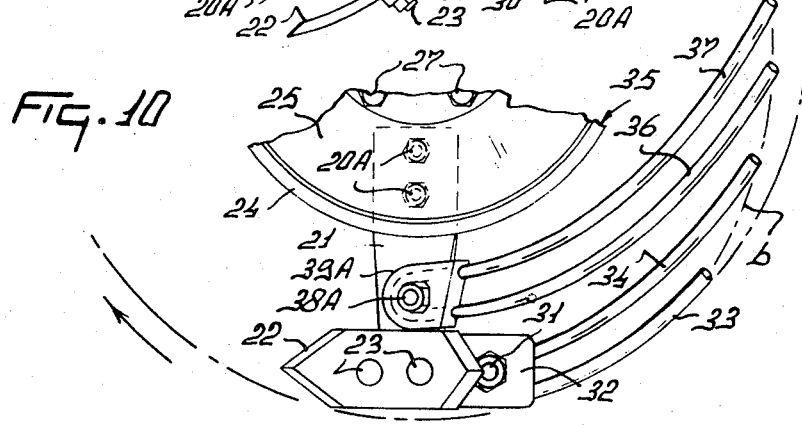

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a side elevation as seen in the direction indicated by an arrow II in FIG. 1, FIG. 3 is a section, to an enlarged scale, taken on the line III—III in FIG. 1, FIG. 4 is a section taken on the line IV—IV in FIG. 3, FIG. 5 is an elevation as seen in the direction indicated by an arrow V in FIG. 4, FIG. 6 is a sectional underneath plan view, the section being taken on the line VI—VI in FIG. 3, FIG. 7 is a further elevation as seen in the direction indicated by the arrow V in FIG. 4 but illustrates an alternative construction, FIG. 8 is a partial plan view corresponding to FIG. 7, FIG. 9 is a further elevation as seen in the direction indicated by the arrow V in FIG. 4 but illustrates another alternative construction, FIG. 10 is a partial plan view of the embodiment of FIG. 9, FIG. 11 is a still further elevation as seen in the direction of the arrow V in FIG. 4 but illustrates another alternative construction, FIG. 12 is a partial plan view of the embodiment of FIG. 11, and FIG. 13 is a side elevation illustrating the employment of an implement in accordance with the invention in combination with the rotary harrow.

Referring to FIGS. 1 to 6 of the drawings, the soil cultivating implement or machine that is illustrated therein comprises a hollow box-section frame portion 1 that extends substantially horizontally transverse, and usually (as illustrated) substantially horizontally perpendicular, to the intended direction of operative travel of the implement that is indicated in FIGS. 1 and 6 of the drawings (and also in FIG. 13) by an arrow A. A plurality (of which there are ten in the embodiment that is being described) of substantially vertical, or at least upwardly extending, shafts 2 and 3 are rotatably journalled in the hollow frame portion 1 in a single row with their longitudinal axes (axes of rotation) spaced apart from one another at regular intervals which advantageously, but not essentially, have magnitudes of substantially 25 cms. It will be seen from FIG. 1 of the drawings that the opposite end shafts of the single row are shafts 2 and that, between each pair of shafts 2, there are two of the shafts 3 thus making a total of four shafts 2 and six shafts 3. Each of the four shafts 2 projects downwardly from beneath the bottom of the hollow frame portion 1 whereas each of the six shafts 3 does not project downwardly to any significant extent, if at all, and is rotatably supported from the upper and lower walls of the frame portion 1 by aligned ball or roller bearings that are mounted in corresponding bearing housings 4. The upper wall of the hollow frame portion 1 is, in fact, afforded by a detachable cover plate 5 whose edges are secured to rims of an underlying trough-shaped part (FIG. 3) of the frame portion 1 by a plurality of short substantially vertically disposed bolts 6, a gasket being interposed between said edges and rims so as to prevent the leakage of lubricant from the interior of the hollow frame portion 1 and the contamination of that interior by external dirt. The upper bearing housings 4 are partially disposed in holes in the cover plate 5 and square flanges of said housing 4 are fastened to that cover plate by further short substantially vertically disposed holes.

The portion of each shaft 2 that projects downwardly from beneath the bottom of the hollow frame portion 1 has a length which is preferred should be not less than 50 cms and not more than 75 cms each shaft 2 being rotatably supported at substantially the level of the bottom of the frame portion 1 by a corresponding ball bearing 7 that is mounted in a housing 8 which is located internally of the frame portion 1, said housings 8 being releasably secured in their appointed positions relative to the bottom of the frame portion 1 by bolts 9. The bolts 9 that correspond to each bearing housing 8 also secure to the lower surface of the bottom of the hollow frame portion 1 an upper flange 11 of a tube 10 that concentrically surrounds the shaft 2 concerned. The integral connection between each tube 10 and its upper flange 11 is strengthened by the provision of a corresponding group of three substantially triangular plates 12 whose positions, and extents, can be seen best in FIGS. 3 and 6 of the drawings. FIG. 6 shows that the leading strengthening plate 12 of each group with respect to the direction A has its general plane in substantially parallel relationship with that direction whereas the other two plates 12 of the same group lie at opposite sides of the general plane of the corresponding leading strengthening plate 12 with their general planes oppositely inclined thereto at angles of substantially 30°. This arrangement of the strengthening plates 12 of each group has the advantage that, when the implement is in operation, the plates 12 will move without difficulty through the soil that is being worked by the implement. Each shaft 2 is rotatably supported, near its lowermost end, by a ball bearing 13 that is mounted in a lower bearing housing 14. Each lower bearing housing 14 comprises an upper portion 15 that is in the form of a lower flange integrally carried by the corresponding tube 2 and a lower portion 16 having an upper rim which is releasably secured to the corresponding upper portion 15 by substantially vertically disposed bolts 27.

The opposite upper and lower ends of each shaft 2 are splined and it will be seen from FIG. 3 of the drawings that the splined lower end of each shaft 2 engages matching splines in a hub 17 that has an upper end of reduced diameter, said upper end being located inside a lower inwardly directed rim of the corresponding lower bearing housing portion 16 with its upper extremity in abutting engagement with the inner race of the corresponding ball bearing 13. Each hub 17 is prevented from becoming detached axially from the lower splined end of the corresponding shaft 2 by being formed with a lowermost recess in which fits a retaining washer 18 that cooperates with the head of a bolt 19 whose shank is screwed into a threaded bore formed axially in the shaft 2 concerned to open at the lowermost extremity thereof. A disc-shaped carrier 20 is formed integrally with each hub 17 at a horizontal level which is substantially mid-way between the uppermost and lowermost ends of that hub, said carrier 20 extending perpendicular to the longitudinal axis of the corresponding shaft 2. Four strip-shaped arms 21 are secured to the bottom of each carrier 20 by pairs of bolts 20A, said arms 21 being spaced apart from one another at 90° intervals around the longitudinal axis of the corresponding shaft 2 (see FIG. 4). Each arm 21 extends substantially radially with respect to the longitudinal axis of the corresponding shaft 2 and, immediately beyond the outer edge of the carrier 20 to which it is bolted, it is twisted torsionally about its own longitudinal axis to produce a supporting surface that is inclined at an angle of between 40° and 45° to a plane that is perpendicular to the longitudinal axis of the corresponding shaft 2 (see FIG. 5), said supporting surface extending upwardly and rearwardly from the leading edge of the arm 21 concerned with respect to the intended direction of operative rotation of the respective shaft 2 (see the arrows that indicate intended directions of operative rotation in FIGS. 1 and 4 of the drawings). The supporting surface of each arm 21 has a corresponding substantially chisel-shaped tool 22 that is formed from strip-shaped material firmly but releasably secured thereto by a pair of short bolts 23 that have countersunk heads. It will be noted from FIGS. 3 and 4 of the drawings that the tools 22 are fastened to the arms 21 in positions which are such that the outer edges of said tools are substantially co-planar with the outer ends of the arms 21 concerned. Each substantially chisel-shaped tool 22 is of regularly curved configuration except for a short central flattened portion that is formed for cooperation with the flat supporting surface of the corresponding arm 21, the concave side of the curve facing upwardly and forwardly with respect to the intended direction of operative rotation of the corresponding shaft 2. The opposite ends of each tool 22 are formed as identical V-shaped tips whose opposite edges are bevelled to form two convergent cutting edges. Each tool 22 can readily be replaced merely by temporarily removing the corresponding pair of bolts 23 and it will be apparent that, during the use of the implement, the lower leading V-shaped tip will be subject to wear at a considerably greater rate than the upper trailing tip. When the lower leading tip has become blunt, the corresponding pair of fastening bolts 23 can be removed and the tool be turned through 180° to interchange the positions of the two tips thereof, subsequently replacing and re-tightening the bolts 23. The useful life of the tool 22 before re-sharpening or replacement becomes necessary is thus considerably extended.

Each set of four tools 22 constitutes, together with the corresponding arms 21 and carrier 20, a rotatable soil working member that is generally indicated by the reference 22A. It is noted that whilst, in the embodiment this is being described, each member 22A comprises four of the tools 22 and four corresponding arms 21, this is not essential and each member 22A may have other numbers of the tools 22 and arms 21. The curved substantially chisel-shaped tools 22 are mounted on their supporting arms 21 in such a way that, as seen in FIG. 5 of the drawings, a line C that is tangential to the lower rear surface of the tool 22 that can be seen in that figure at the leading lower tip thereof is inclined to a plane that is perpendicular to the longitudinal axis of the corresponding shaft 2 at an angle of substantially 15°. Each of the four disc-shaped carriers 20 has an upright rim 24 at its outer edge which rim very closely surrounds the lower edge of a corresponding frusto-conical hood 25. The upper end of each hood 25 has an inwardly directed substantially planar rim and that rim, together with the inwardly directed rim at the upper edge of an underlying ring 26 is clamped to the corresponding lower bearing housing 14 by the same bolts 27 which releasably secure to one another the portions 15 and 16 of said housing 14. Each hub 17 has a flange 28 that is parallel to, but spaced upwardly away from, the corresponding carrier 20 and it will be seen from FIG. 3 of the drawings that the outer edge of each flange 28 is located very close indeed to the inner curved surface of the corresponding cylindrical ring 26. The nonrotary hood 25 and the rim 24 of the carrier 20 that correspond to each soil working member 22A cooperate to form protective elements that are designed to prevent, or greatly minimise, the winding of stalks and other plant parts around each shaft 2. Second protective elements in the form of the nonrotary cylindrical rings 26 and the cooperating rotary flanges 28 are located radially inside, and beneath, the rims 24 and hoods 25 and are also designed to avoid stalks and other plant parts from becoming wound around the shafts 2 and the rotary soil working members 22A. The conically curved surface of each hood 25 is formed with two holes 25A that will register with any chosen pair of the bolts 20A so that box spanners or the like can be used to cooperate with the nuts of said bolts 20A when one or more of the arms 21 is to be removed and/or replaced.

As seen in the sectional plan view of FIG. 4 of the drawings, the radially outer edge of each tool 22 is substantially tangential to an imaginary circle that is centered upon the longitudinal axis of the corresponding shaft 2 and this is equally true of the tools 22 that are employed in the alternative embodiment of FIGS. 7 and 8 of the drawings. In this latter embodiment, the soil working members 22A are replaced by soil working members 29 which are identical to the members 22A except that the upper rear (with respect to the intended direction of operative rotation of the member 29 concerned) edge of the portion of each arm 21 that affords the supporting surface for the corresponding tool 22 carries a support 30 that is perpendicular or substantially perpendicular to the longitudinal axis of the corresponding shaft 2. Each support 30 has the integral junction between a pair of guide members in the form of spring steel or other resilient rods or tines 33 and 34 firmly but releasably secured to it by a clamping member 32 and a cooperating bolt 31. The integral rods or tines 33 and 34 are preferably formed from single lengths of spring steel rod of circular cross-section, each integral pair having the basic shape of a hairpin with the integral junction between the two tines 33 and 34 thereof in the form of a substantially 180° bend. It can be seen in FIG. 7 of the drawings that, viewed lengthwise along one of the arms 21, both rods or tines 33 and 34 of each pair are bent over so as to extend obliquely upwardly and rearwardly (with respect to the intended direction of operative rotation of the member 29 concerned) from points that are very close to the corresponding clamping member 32. However, after extending obliquely upwardly and rearwardly in a substantially rectilinear manner (as seen in FIG. 7), both tines 33 and 34 assume a regularly curved configuration which is such as to make them progressively less steeply inclined to planes that are perpendicular to the axis of rotation of the corresponding shaft 2 as the proximity of the free uppermost and rearmost ends thereof becomes greater. It will be immediately apparent from an examination of FIG. 7 of the drawings that the curvature of the portion of the radially outer tines 33 of each pair that has just been discussed is considerably greater than is the curvature of the corresponding portion of the companion, and longer, tine 34.

As seen in a direction which is parallel to the longitudinal axis of the corresponding shaft 2 (FIG. 8), both rods or tines 33 and 34 of each pair are curved but, in this case, the curvature is constant throughout the length of those parts of the tines that are not engaged by the corresponding member 32. Both the rods or tines 33 and 34 of each pair appear, in FIG. 8 of the drawings, to be regularly curved, the centers of curvature of both of them coinciding, or substantially coinciding, with the longitudinal axis/axis of rotation a (FIG. 3) of the corresponding shaft 2. Again as seen in FIG. 8 of the drawings, the two guide members or tines 33 and 34 of each pair constitute a substantially uninterrupted rearward extension of the corresponding elongate chisel-shaped tool 22.

FIG. 9 and 10 of the drawings illustrate a soil working member that is generally indicated by the reference 35, the soil working member 35 being similar or identical, in many respects, to the soil working member 29 that has just been described with reference to FIGS. 7 and 8 of the drawings. However, the soil working member 35 of FIGS. 9 and 10 differs from the soil working member 29 of FIGS. 7 and 8 in that four additional pairs of guide members (only one of which pairs is illustrated) are provided, each additional pair of guide members comprising two integrally interconnected rods or tines 36 and 37. Each pair of rods or tines 36 and 37 is of resilient formation and is preferably formed from spring steel of circular cross-section, the integral pair being basically hair-pin shaped. There is a substantially 180° bend integrally interconnecting the two tines 36 and 37 of each pair and said bend is releasably secured to the torsionally twisted portion of the corresponding arm 21 by a clamping member 39A and a cooperation bolt 38A. It will be seen from FIG. 10 of the drawings that each clamping member 39A is located immediately radially inwardly alongside the corresponding tool 22 on the stripshaped arm 21 concerned. As viewed radially lengthwise along arm 21 (FIG. 9), the two rods or tines 36 and 37 of each pair are very nearly straight but are actually both very slightly curved in such a way that the convex side of the curvature faces upwardly and forwardly with respect to the intended direction of operative rotation of the member 35 of which the tines 36 and 37 form a part. When viewed in a direction parallel to the longitudinal axis of the corresponding shaft 2 (FIG. 10), the two tines 36 and 37 of each pair are both curved throughout the lengths thereof that are the free ends from the corresponding clamping member 39A. The two rods or tines 36 and 37 are intially curved in such a way that their centers of curvature substantially coincide with the longitudinal axis of the corresponding shaft 2 but the curvature of both of them then becomes a little less pronounced so that the spacing thereof from the longitudinal axis of the corresponding shaft 2 becomes progressively greater as the proximity of the free ends or tips of the tines increases. FIG. 10 also shows that the lengths of the four rods or tines 33, 34, 36 and 37 that correspond to each arm 21 vary in inverse proportion to the magnitude of the spacing therof from the axes of the corresponding shaft 2, the outer tine 33 thus being the shortest and the inner tine 37 the longest. The arrangement is, in fact, such that, when the four rods or tines 33, 34, 36 and 37 that correspond to one of the arms 21 are projected onto a plane that is perpendicular to the axis of the shaft 2 by viewing in a direction that is parallel to said axis (i.e. as seen in FIG. 10), a tangent to a regularly curved line b that interconnects the free ends or tips of all four of the tines is inclined to a tangent (at the same point) to the circle that is tracted by the outermost extremities of the four tools 22 of the member 35 concerned, when that member is rotated about the axis of the corresponding shaft 2, at an angle of substantially 6°.

FIGS. 11 and 12 of the drawings illustrate a further embodiment in which rotary soil working members that have been described above, but each member 38 being provided with four radially extending arms 39 that are a little shorter in length than the arms 21 but that are otherwise similar in construction and mounting to those arms 21. A cylindrical sleeve-like holder 40 is welded or otherwise rigidly secured to the radially outermost end of each arm 39, the longitudinal axis of each holder 40 being tangential to an imaginary circle that is centered upon the longitudinal axis of the corresponding shaft 2 when the member 38 is viewed in a direction that is parallel to the latter axis (i.e. as seen in FIG. 12). In fact, the longitudinal axis of each holder 40 is inclined to a plane that is perpendicular to the longitudinal axis of the corresponding shaft 2 by the same angle of 40° to 45° as is the supporting surface that is afforded by the torsionally twisted portion of the corresponding arm 39 (see FIG. 11). Each holder 40 receives a fastening portion 41 of a corresponding rigid soil working tool 42 that is in the form of a tine. Each tine-like tool 42 also includes a curved soil working portion 43 that projects forwardly with respect to the intended direction of operative rotation of the corresponding member 38 from the leading end of the respective holder 40 in such a way that, as seen in FIG. 12 of the drawings, its center of curvature substantially, although not exactly, coincides with the longitudinal axis axis of the corresponding shaft 2. Actually, as can be seen in FIG. 12, the regular curvature of the soil working portion 43 of each tool 42 is such that the leading free end or tip thereof is a little further spaced from the longitudinal axis of the corresponding shaft 2 than is the root end thereof that corresponds in position with the junction between the fastening portion 41 and soil working portion 43 of the tool 42 under consideration. The soil working portion 43 of each tool 42 is also regularly curved when the soil working member 38 is viewed radially lengthwise of the corresponding arm 39 (i.e. as seen in FIG. 11 of the drawings), the curvature being such that the concave side thereof faces upwardly and forwardly with respect to the intended direction of operative rotation of the tool 38 with a tangent to said portion 43 at the leading free end or tip thereof inclined to a plane that is perpendicular to the longitudinal axis of the corresponding shaft 2 by an angle of substantially 15°. The soil working portion 43 of each tool 42 is of substantially rhombic cross-section, the four corners of the cross-section being shaped to form flattened or rounded ribs which extend lengthwise along the portion 43 while the what would otherwise be four flat sides of the cross-section are formed with inwardly directed grooves or recesses that also extend lengthwise along the portion 43, said grooves or recesses having such widths that they comprise all or most of each side of the portion 43 between the corresponding ribs.

The fastening portion 41 of each tool 42 is formed with a pair of diametrically opposed lugs 44 and said lugs are so positioned as to become entered in notches that are formed at the top and bottom of the corresponding holder 40 at the front of the latter with respect to the intended direction of operative rotation of the member 38 concerned. The fastening portion 41 fits snugly but releasably in the internal bore of the corresponding holder 40 and has a short screwthreaded end part that projects beyond the upper rear end of the cooperating holder 40. This screwthreaded end part receives a matchingly screwthreaded fastening nut 45 that is preferably of a known kind which incorporates an insert designed to prevent the nut 45 from accidently working loose when the implement is in operation. It will be appreciated that, when the lugs 44 of each tool 42 are entered in the notches in the cooperating holder 40 and the nut 45 concerned has been tightened, the tool 42 cannot turn about the longitudinal axis of its fastening portion 41 in said holder 40. The torsionally twisted portion of each arm 39 that affords a supporting surface has a corresponding guide member in the form of a spring steel strip 47 firmly but releasably secured to it by a bolt 46. Each strip 47 is thus positioned radially inwardly from the corresponding holder 40 along the arm 39 concerned and it will be noted from FIG. 12 of the drawings that the leading lower end of each strip 47 is bent over upwardly to cooperate with the leading edge of the corresponding arm 39 intending to prevent the strip 47 from turning to any significant extent above the axis of the bolt 46 after installation. When one of the strips 47 is viewed in a radial direction that extends lengthwise of the corresponding arm 39 (i.e. as seen in FIG. 11), said strip 47 initially extends in upwardly curved prolongation of the curvature of the soil working portion 43 of the corresponding tool 42, the curvature of the strip 47 then being reversed towards the uppermost end of the strip so that the convex side thereof is foremost with respect to the intended direction of operative rotation of the corresponding member 38. Each strip 47 finally terminates at its uppermost end in a portion that is bent over downwardly to lie in a plane that is perpendicular or substantially perpendicular to the longitudinal axis of the corresponding shaft 2, said bent over portion thus usually being horizontally or substantially horizontally disposed. It will be seen from FIG. 12 of the drawings that the bent over portion of each strip 47 is formed with a bevelled cutting edge so that said strip actually terminates at its radially inner edge in an angularly pointed tip. The bevelled cutting edge is substantially tangential, as seen in FIG. 12 of the drawings, to an imaginary circle that is centered upon the longitudinal axis of the corresponding shaft 2, said imaginary circle also substantially coinciding (as seen in FIG. 12) with the path that is tracted by the radially outer extremities of the four holders 40 of the corresponding member 38 during operative rotation of that member. The strips 47 of each member 38 extend substantially tangentially with respect to a further imaginary circle that is centered upon the longitudinal axis of the corresponding shaft 2 when said member is projected onto a plane that is perpendicular to said longitudinal axis by viewing in a direction parallel to that axis (FIG. 12).

The opposite ends of the hollow box-section frame portion 1 of the implement are closed by substantially sector-shaped side plates 48 that are substantially vertically parallel to one another and parallel or substantially parallel to the direction A, the longer upright edges of the two plates 48 being located foremost relative to that direction (see FIG. 2). Upper rear corners of the two plates 48 carry strong substantially horizontally aligned pivots 49 about which corresponding arms 50 are turnable upwardly and downwardly alongside the respective plates 48. The arms 50 extend generally forwardly with respect to the direction A from their pivots 49 and it can be seen in FIG. 1 of the drawings that each arm 50 is off-set inwardly towards the centre of the implement at a location just in front of the corresponding plate 48 by a pair of opposed angular bends. The extent of the off-set is such that the leading portion of each arm 50 with respect to the direction A is located just inwardly towards the centre of the implement from the side plate 48 at the neighbouring end of the frame portion 1. The free leading ends of the two arms 50 carry corresponding substantially horizontally disposed axle shafts 51 that are located at the relatively remote outwardly facing sides of the two arms 50, each axle shaft 51 having a corresponding pneumatically tired groundwheel 52 rotatably mounted thereon. Reference to FIG. 2 of the drawings will show that each ground wheel 52 has a diameter which is not less than substantially equal to the distance between the cover plate 5 at the top of the hollow frame portion 1 and the lower ends of the four non-rotary tubes 10. Each side plate 48 is formed close to its leading edge with a curved row of holes 54 that are equidistant from the substantially horizontal axis that is defined by the aligned pivots 49 and each arm 50 is formed with a single hole that can be brought into register with any chosen one of the holes 54 in the corresponding row by turning said arm upwardly or downwardly about the pivot 49 concerned. Bolts 53 or like fastenings are provided for substantially horizontal entry through said single holes and the chosen holes 54 and, when said bolts 53 or like fastenings are tightened, the position of the usually aligned axes of rotation of the two ground wheels 52 relative to the level of the hollow frame portion 1 is fixed.

Two supports 54A are secured to the top of the hollow frame portion 1 at equal distances from the midpoint of that frame portion, the two supports 54A extending parallel to one another and substantially horizontally parallel to the direction A with the opposite ends of both of them projecting both in front of, and behind the frame portion 1. A hollow tie beam 55 of square cross-section perpendicularly interconnects the leading ends of the two supports 54A and thus extends parallel to the transverse length of the hollow frame portion 1. The rearmost ends of the two supports 54A are similarly interconnected by a substantially horizontally disposed tie beam 56 that is parallel to the beam 55 but it will be noted from FIGS. 1 and 2 of the drawings that the disposition of the beam 56 is a little different to that of the beam 55. The beam 55 lies above the two supports 54A and has its lower surface rigidly secured to them whereas the square cross-section beam 56 is turned through 45° about its own longitudinal axis as compared with the beam 55 and is secured to the rearmost ends of the two supports 54A in such a way that said longitudinal axis is substantially coplanar with the longitudinal axes of the two supports 54A themselves. Two plates 57 are substantially vertically disposed in parallel relationship with one another and substantially parallel relationship with the direction A depend from the leading tie beam 55 at locations which are spaced by equal distances from the mid-point of that beam. The relatively remote sides of the two plates 57 carry substantially horizontally aligned coupling pins 58A which pins define an axis that is parallel or substantially parallel to the transverse length of the frame portion 1. As can be seen somewhat diagrammatically in FIGS. 1 and 2 of the drawings, the coupling pins 58A are constructed and arranged for cooperation with the free ends of the lower lifting links of a three-point lifting device or hitch at the rear of an agricultural tractor or other operating vehicle. In addition to being rigidly secured to the tie beam 55, the upper ends of the two plates 57 are rigidly connected to the front of the hollow frame portion 1 by forwardly projecting substantially triangular plates 58. A central region of the top of the leading tie beam 55 is provided with an upright assembly which includes two upwardly convergent strips 59 and a pair of vertically or substantially vertically disposed parallel plates 60 that are spaced apart from one another by a short horizontal distance at the upper ends of the two convergent strips 59. The two plates 60 are formed with horizontally aligned holes that are arranged to receive a pivot pin for cooperation with a sleeve at the rear end of the upper adjustable length lifting link of the same three-point lifting device or hitch whose lower lifting links cooperate with the pins 58A. Lower regions of the two plates 60 are rigidly connected by downwardly and rearwardly divergent tie beams 61 to locations at the top and rear of the hollow frame portion 1, said two locations being disposed close to the opposite ends of said frame portion 1. Two pair of lugs 62 depend from the rear substantially horizontal tie beam 56 at equal distances from the mid-point of that tie beam and the top of the latter is provided with coupling assembly that is very similar to the coupling assembly that is mounted on top of the leading tie beam 55, the rear coupling assembly including a pair of upwardly convergent strips 63 and a pair of centrally mounted, substantially vertically disposed plates 64 that are located at the upper ends of the strips 63 in horizontally spaced apart relationship. The rear coupling assembly does not, however, include any obliquely disposed tie beams that are equivalent to the tie beams 61. The fronts of the two rear plates 64 are connected by a forwardly extending rod or bar 65 to the rears of the two leading substantially vertical plates 60.

Each of the ten shafts 2 and 3 is provided, inside the hollow frame portion 1, with a corresponding straight-toothed or spur-toothed pinion 66, there thus being a single row of ten pinions 66 whose dimensions and arrangement are such that each pinion 66 has its teeth in mesh with those of its immediate neighbour, or those of both of its immediate neighbours, in said row. The second shaft 2 from one end of the row of ten shafts 2 and 3 has an upward extension through the top of the cover plate 5 into a gearbox that is mounted on top of the hollow frame portion 1. The gearbox 67 is of flat configuration as seen in side elevation (FIG. 2) but is somewhat pear-shaped as seen in the plan view of FIG. 1. The upward extension of the shaft 2 is provided, inside the gearbox 67, with a toothed pinion 68 whose diameter is substantially twice that of any one of the pinions 66, the teeth of a large pinion 68 being in driven mesh with those of a smaller pinion 69 that is also located inside the gear-box 67. The smaller pinion 69 has a diameter which is less than that of any of the pinions 66. The small pinion 69 is secured to a substantially vertical shaft 69A which, like the upward extension of said shaft 2, is rotatably journalled by bearings in the gear-shaft 67, the shaft 69A, however, extending upwardly through the top of the flat gear-box 67 into a second gear-box 70 that is secured in position on top of the gear-box 67. It will be seen from FIG. 1 of the drawings that the shaft 69A is located substantially rearwardly with respect to the direction A in register with one of the centre pair of short shafts 3 of the row of ten shafts 2 and 3, said shaft 69A being in parallel relationship with all of the shafts 2 and 3. The upper end of the shaft 69A that is located inside the second gear-box 70 carries a bevel pinion (not visible) whose teeth are in driven mesh with those of a further bevel pinion (not visible) carried by a shaft (not visible) that extends substantially, but not exactly, horizontally parallel to the direction A, said shaft being rotatably journalled by bearings in the gear-box 70. A change-speed gear 71 is mounted at the back of the gear-box 70 with respect to the direction A and the rear end of the substantially horizontal shaft (not visible) that has just been mentioned projects through the rear wall of said second gear-box 70 into the change-speed gear 71 together with a portion of a neighbouring shaft 72 that is substantially horizontally parallel thereto. The portion of the shaft 72 and the portion of the relatively parallel shaft (not visible) that are disposed inside the change-speed gear 71 are both splined or otherwise keyed for cooperation with the matchingly splined or keyed hubs of a chosen pair of straight-toothed or spur-toothed pinions (not visible) that can be interchangeably and/or exchangeably mounted thereon. Preferably, there are at least two cooperating pairs of such pinions of different sizes and it will be realised that the particular pair which is chosen, and the arrangement thereof that is selected within the change-speed gear 71 will dictate the transmission ratio between the shaft 72 and the relatively parallel shaft that is not visible in the drawings and thus the speed at which the rotary soil working members of the implement will be driven in response to a substantially constant input speed of rotation that is applied to the shaft 72. The leading splined or otherwise keyed end of the shaft 72 projects forwardly from the front of the second gear-box 70 in substantially the direction A and is intended to be placed in driven connection with the power take-off shaft at the rear of an agricultural tractor or other operating vehicle through the intermediary of a telescopic transmission shaft 73, that is of a construction which is known per se, having universal joints at its opposite ends. A splined or otherwise keyed portion of the shaft 72 also projects rearwardly from the implement through the cover of the change-speed gear 71 and can be employed in transmitting rotary power to the working parts of a second implement or machine that may be used in combination or conjunction with the implement that has been described, for example, as will be set forth below in relation to FIG. 13 of the drawings.

The rear three-point coupling assembly that is carried principally by the rear tie beam 56 of the implement can be used in connecting a further implement or machine to the implement that has been described above for use in combination with that implement. An example of such an arrangement is shown in FIG. 13 of the drawings where a rotary harrow that is generally indicated by the reference 74 is connected to said rear coupling assembly. The rotary harrow 74 has a hollow box-section frame portion 75 that extends substantially horizontally transverse, and usually (as illustrated) substantially horizontally perpendicular, to the direction A in parallel or substantially parallel relationship with the hollow frame porion 1 of the leading implement. A plurality of substantially vertical, or at least upwardly extending, shafts are rotatably supported in the hollow frame portion 75 in a single row with each shaft projecting from beneath the bottom of that frame to carry a corresponding tined soil working member 77. The axes of rotation of the shafts which carry the soil working members 77 are spaced apart from one another at regular intervals which preferably, but not essentially, have magnitudes of substantially 25 cms. The opposite ends of the hollow box-section frame portion 75 are closed by substantially vertical sector-shaped side plates, arms 78 being turnable upwardly and downwardly alongside those two side plates about substantially horizontally aligned pivots that are located at the front of the hollow frame portion 75 with respect to the direction A. The arms 78 can be firmly, but releasably, secured in selected angular positions about the axis that is defined by the pivots to which they are connected in a manner that is basically similar to the arrangement of the arms 50 that has already been described above with reference to FIGS. 1 and 2 of the drawings. However, the arms 78 extend generally rearwardly from their pivots with respect to the direction A and their rearmost ends carry substantially horizontal bearings between which a rotary supporting member and soil crumbling member of the harrow 74, in the form of an open ground roller 79, is mounted in a freely rotatable manner. The shafts to which the soil working members 77 of the harrow 74 are connected are provided, inside the hollow frame portion 75, with corresponding straight-toothed or spur-toothed pinions 80 so that there is a single row of the pinions 80 whose sizes and arrangement are such that the teeth of each pinion 80 are in mesh with those of its immediate neighbour, or with those of both of its immediate neighbours, in said row. One of the shafts that corresponds to a substantially central pinion 80 of the single row has an upward extension through the top of the frame portion 75 into a gear-box 81 that is fastened to the top of the frame portion. As shown diagrammatically in FIG. 13 of the drawings, the upward shaft extension carries a bevel pinion whose teeth are in driven mesh with those of a smaller bevel pinion carried by a substantially horizontal shaft that is substantially horizontally parallel to the direction A. Said shaft is rotatably mounted in the gear-box 81 and projects through a rear wall of that gear-box into a change-speed gear 82 that is secured to the back of the gear box 81. The shaft is splined or otherwise keyed inside the change-speed gear 82 as is the rear end of an overlying parallel shaft 83 that is also rotatably mounted in the gear-box 81. The splined or otherwise keyed rear ends of the two shafts that extend into the change-speed gear 82 are arranged to cooperate interchangeably and/or exchangeably with the matchingly splined or keyed hubs of cooperating pairs of straight-toothed or spur-toothed pinions that can be mounted thereon. As in the case of the previously described change-speed gear 71, the particular pair of pinions that is chosen for use in the change-speed gear 82, and the arrangement thereof that is selected on the two shaft ends, dictates the transmission ratio between the shaft 83 and the underlying parallel shaft and thus the speed at which all of the soil working members 77 will be driven in response to a substantially constant input speed of rotation that is applied to the leading end of the shaft 83. The leading splined or otherwise keyed end of the shaft 83 projects forwardly from the front of the gearbox 81 in substantially the direction A and is arranged to be placed in driven connection with the rear end of the shaft 72 of the implement that has been described above by way of a telescopic transmission shaft 84, that is of a construction which is known per se, having universal joints at its opposite ends.

The rotary harrow 74 has a three-point coupling assembly 75A that is secured to its frame portion 75 and said assembly is arranged to be connected pivotally to the rear coupling assembly of the implement that has been described above by way of an upper link 85 and two spaced lower links 86. The leading ends of the lower link 86 cooperate with the aforementioned pairs of lugs 62 (FIG. 2). It will be seen from FIG. 13 of the drawings that the rotary harrow 74 is connected to the rear coupling assembly of the implement that has been described above through the intermediary of a quadrilateral linkage which is substantially, although not exactly, a parallelogram linkage. In any case, said linkage enables the harrow 74 to move upwardly and downwardly during the use of the combination of FIG. 13 independently of upward and downward movements of the leading implement of the combination. Downward movement of the harrow 74 relative to the leading implement are however, limited by providing chains 87 between the plates 64 of the rear coupling assembly of the leading implement and anchorages close to the rear ends of the lower links 86. The flexible but inextensible chains 87 ensure that the rotary harrow 74 will be lifted with the leading implement of the combination if the three-point lifting device or hitch at the rear of the agricultural tractor or other vehicle which operates the implement is raised to bring both implements clear of operative contact with the ground surface.

In the operation of the soil cultivating implement that has been described, its leading coupling assembly is connected to the three-point lifting device or hitch at the rear of an agricultural tractor or other operating vehicle using the lower coupling pins 58A and the upper coupling plates 60. The rotary input shaft 72 of the second gear-box 70 is placed in driven connection with the rear power take-off shaft of the same tractor or other operating vehicle through the intermediary of the known telescopic transmission shaft 73 that has universal joints at its opposite ends. Adjustments that can, if require, be made before work commences include determining the maximum depth to which the soil working members 22A, 29, 35 or 38 can penetrate into the ground by changing the angular positions of the arms 50 about the substantially horizontal axis that is defined by the pivot 49 and altering the speed at which said soil working members will revolve in response to a substantially constant input speed of rotation that is applied to the leading end of the shaft 72 by varying the transmission ration in the change-speed gear 71. These adjustments will normally be made in the light of the nature and condition of the soil that is to be cultivated and the particular purpose for which that soil is required after the cultivation. As the implement moves forwardly in the direction A over land that is to be cultivated, its soil working members, such as the members 22A, will revolve rapidly about the axes a of the corresponding shafts 2, each member revolving in the opposite site direction to the or each of its neighbours (see the arrows in FIG. 1 of the drawings) and each member working an individual strip of soil that will marginally overlap, or at least adjoin, the strip that is worked by the or each of its neighbours so as, in effect, to produce a single broad strip of worked ground whose width is substantially the same as that of the path of travel of the implement. The axes a of the four shafts 2 will be vertically or substantially vertically disposed during the use of the implement, their precise inclination to the horizontal being adjustable by increasing or decreasing the length, in known manner, of the upper adjustable lifting link of the three-point lifting device or hitch of the tractor or other vehicle to which the implement is connected. Each rotary soil working member has an effective diameter of substantially 75 cms, so that the overall working width of the implement that is illustrated in the drawings by way of example is substantially 3 meters. Each of the rotary soil working members, such as the members 22A, is rotatably supported at substantially the same horizontal level as its tools 22 by the corresponding lower ball bearing 13, the construction and arrangement being such that, during operation, each disc-shaped carrier 20 will usually be disposed substantially continuously beneath the surface of the ground that is being cultivated. The chisel-shaped tools 22 project both above and beneath, the general plane of the corresponding carrier 20 and FIG. 2 of the drawings illustrates a working position in which the members 22A cultivate an upper layer of top soil. The tools 22 of each member 22A move through the top soil in such a way that their leading points or tips cut the top soil loose, the displaced soil being guided upwardly and rearwardly over the concave upwardly and forwardly facing surfaces of the tools 22 so that the displaced soil is quite intensively crumbled. Although the implement may be effectively employed in substantially the manner that has just been described with reference to what is shown somewhat diagrammatically in FIG. 2 of the drawings, it is, in fact, principally intended for the cultivation of soil at a significantly greater depth. When operating in this way, the displaced soil that is moved upwardly by the tools 22 of the members 22A exerts a considerable upward pressure upon the overlying layers of soil so that crumbling will tend to occur along natural lines of fracture with a break-up of the cohesion of, for example, any large lumps of compacted soil. The crumbling effect of the implement upon the soil can be enhanced by using the implement with the soil working members 29 or 35 of FIGS. 7 to 10 of the drawings instead of the members 22A. With these alternative soil working members, the crumbling effect of the tools 22 is considerably augmented by the upward effect of the resilient guide members that are afforded by the spring steel rods or tines 33 and 34 or 33, 34, 36 and 37. The soil that is conveyed upwardly by the spring steel tines 33 and 34 of the embodiment of FIGS. 7 and 8 of the drawings is also displaced outwardly away from the shafts 2 to some extent so that the overall width of the strip that is worked by each member 29 is somewhat enlarged as compared with the use of the members 22A. The employment of the tines 33 and 34 increases the upward crumbling pressure on the overlying top soil layers when, as will usually be the case, the tools 22 of the members 29 are working at subsoil depth. The spring steel or other resilient tines 33 and 34 will, of course, be constantly subject to varying forces during their cycloidal progress through the top soil layers and this causes them to perform irregular vibrations whose frequencies and amplitudes are dependent to a large extent upon their nature and condition of the soil that is being cultivated. The vibrations nevertheless intensify the crumbling effect upon the overlying layers of top soil.

When the soil working members 35 of FIGS. 9 and 10 of the drawings are employed, the additional guide members that are afforded by the pairs of spring steel or other resilient rods or tines 36 and 37 considerably increase the upward pressure upon the overlying layers of top soil so that these layers tend to be pushed forcibly upwards with a surging action. This intensified effect can be particularly beneficial when exerted upon heavy soils that are in wet condition. The rotary soil working members 38 of FIGS. 11 and 12 of the drawings are, conversely, particularly advantageously used when soil that is in a very dry condition is to be cultivated. Although such soils may be dusty and/or cracked at the surface, they are often very hard at levels beneath the surface and the tine-like tools 42 are designed to break up the hardened soil layers without the increased danger of damage that would exist if the less rigid tools 22 were to be employed. The leading end regions of the soil working portions 43 of the tools 42 are inclined to the horizontal (assuming a substantially vertical disposition of the longitudinal axes of the shafts 2) by only a few degrees and thus effectively cut loose the overlying layers of soil which are subsequently guided upwardly by the more steeply inclined portions of the tools 42, their holders 40, the arms 39 and the guide members that are afforded by the spring steel or other resilient strips 47, the latter being the primary parts of the members 38 that cause upward displacement of the loosened soil.

The soil working members 22A, 29, 35 and 38 are readily interchangeable, it only being necessary temporarily to remove the bolts 19 and cooperating washers 18 (FIG. 3) to allow one set of four soil working members of one kind to be exchanged for a set of four soil working members of another kind. The treatment which the implement will perform may be performed with particular advantage in the autumn since, after cultivation, the drainage of the land will have been improved allowing frost to penetrate into the soil to perform its well known natural crumbling effect upon that soil to create appropriate conditions for the subsequent sowing of seeds. Heavy soils benefit particularly in this respect from a prior cultivation by an implement in accordance with the invention. The top soil in which seeds will subsequently be sown or into which small plants may be introduced is, in effect, cultivated from beneath rather than from above so that any stones in the upper layers of the top soil are merely displaced upwardly and do not jam between the rapidly rotating soil working members. Quite high forces are, of course, exerted upon the shafts 2 during operation but those shafts are capable of withstanding such forces, particularly since the ball bearings 7 and 13 (FIG. 3) by which they are rotatably supported are spaced apart from one another by a large distance. The lower bearings 13 that are located at substantially the same level as the tools 22 or 42 are particularly important in reliably resisting the forces to which the rotating shafts 2 and the parts to which they are connected are subject during the use of the implement. In the embodiment which is being described, each of the pinions 66 inside the hollow frame portion 1 has an effective diameter of substantially 25 cms. and it will immediately be evident from FIG. 3 of the drawings that the axial distance between the two ball bearings 7 and 13 which rotatably support each shaft 2 is much larger than the effective diameter of each pinion 66. The provision of two sets of protective elements, as described above, near each lower ball bearing 13 to prevent plant stalks and the like from becoming wound around the rotating parts greatly reduces the danger of an excessive load being produced upon those rotating parts which would otherwise tend to occur if the protective elements were omitted.

An implement in accordance with the invention may advantageously be employed in combination with another implement or machine in, for example, the manner that has been described with reference to FIG. 13 of the drawings where the rotary harrow 74 is used to the rear of the soil cultivating implement. Such a combination may advantageously be used in the spring in preparing soil for use as a seed bed. The rotary soil working members of the soil working implement, for example the members 29, will perform a deep cultivation of the soil in the manner that has been described above while the tined soil working members 77 of the following rotary harrow 74 thoroughly crumble the upper layers of top soil and leave that soil in a condition in which it is ready to receive seeds. The working depth of the members 29 is adjusted in the manner that has been described above by displacing the arms 50 upwardly or downwardly about their pivots 49 while, similarly, the working depth of the tined members 77 of the harrow 74 can be adjusted by displacing the roller 79 upwardly or downwardly relative to the frame portion 75 using the arms 78. The rotary harrow 74 can move upwardly and downwardly independently of the soil working implement to match undulations in the surface of the ground over which the combination moves by virtue of its pivotal connection to the rear coupling assembly of the soil cultivating implement by way of the links 85 and 86. As previously mentioned, the limiting chains 87 ensure that, when the three-point lifting device or hitch of the agricultural tractor or other operating vehicle is raised to lift the soil cultivating implement clear of contact with the ground, the rotary harrow 74 will also be lifted clear of contact with the ground. The implement combination can then readily be transported from one place to another by the tractor or other operating vehicle to which it is connected.

Although various features of the soil cultivating implement embodiments that have been described and/or that are illustrated in the accompanying drawings will be set forth in the following claims as inventive features, it is emphasized that the invention is not necessarily limited to those features and that is includes within its scope each of the parts of each of the soil cultivating implement embodiments that has been described, and/or that is illustrated in the accompanying drawings, both individually and in various combinations.

What we claim is:

1. A soil cultivating implement comprising a frame and at least one soil working member rotatably mounted on said frame, said member comprising an elongated, substantially vertical shaft and a tool carrier adjacent the lower end of the shaft, the outer periphery of said carrier extending in a generally horizontal plane and driving means connected to rotate said carrier about an axis defined by said shaft, a part of said driving means being mounted adjacent the upper end of the shaft, tool means connected to said carrier by an arm and said arm comprising a support for said tool means, said tool means being fastened to said support intermediate opposite ends of the tools means, said tool means having a lower free end and an upper free end positioned below and above said arm, respectively, said lower free end being in leading position with respect to the normal direction of rotation of said member, said tool means being substantially tangential to the axis of rotation of said carrier, said tool including a resilient guide that extends rearwardly beyond said upper free end, said guide comprising rods.

2. An implement as claimed in claim 1, wherein the upper end of said shaft mounts a pinion of said driving means and said shaft is rotatably supported by two spaced apart bearings on the shaft, said bearings being spaced apart by a distance greater than the effective diameter of said pinion.

3. An implement as claimed in claim 1, wherein the rods are curved upwardly, away from fastening points on the soil working member, to terminate in curved portions that extend in the opposite direction, the rod furthest from the axis of rotation of said member being more steeply curved in said opposite direction than the rod nearest to said shaft.

4. An implement as claimed in claim 3, wherein two rods of a radially inner pair of rods initially extend substantially parallel to one another from fastening points on the respective soil working member, the radially innermost rod having an upper end portion that projects rearwardly beyond the corresponding end portion of the outermost rod of the same pair in a direction inclined away from said shaft.

5. An implement as claimed in claim 4, wherein a tangent to a regularly curved line interconnecting the free ends of the four rods of said two pairs is inclined about 6° to a tangent, at the same point, to a circle traced by the upper end of the outermost of said four rods.

6. An implememt as claimed in claim 1, wherein there are a plurality of tools secured adjacent the outer periphery of said carrier, each tool being chisel-shaped and having two opposite ends that comprise opposing cutting edges.

7. An implement as claimed in claim 6, wherein each tool has opposite free ends that are substantially identical and said tool is curved in configuration for at least a major portion of its length.

8. An implement as claimed in claim 7, wherein a tangent to said curved portion taken at the leading free end thereof with respect to the direction of its operative rotation is inclined at an angle of about 15° to a plane perpendicular to the axis of rotation of said shaft.

9. An implement as claimed in claim 4, wherein there are a plurality of tools and each tool is connected to said carrier by a respective radial arm.

10. An implement as claimed in claim 9, wherein each arm is strip-shaped and twisted torsionally about its own longitudinal axis at a location radially beyond the periphery of said carrier.

11. An implement as claimed in claim 10, wherein each arm affords a supporting surface for a corresponding tool which is fastened to that surface intermediate opposite ends of the tool, part of the tool extending upwardly and rearwardly away from said surface with respect to the direction of operative rotation of the soil working member.

12. An implement as claimed in claim 9, wherein each tool comprises a tine and said tine has a fastening portion that is arranged in a holder supported by the carrier, said holder having a longitudinal axis that is inclined at an angle of between 40° to 45° to a plane perpendicular to the axis of rotation of said member.

* * * * *